United States Patent [19]

Klim et al.

[11] Patent Number: 5,261,107
[45] Date of Patent: Nov. 9, 1993

[54] PROGRAMABLE INTERRUPT CONTROLLER

[75] Inventors: Peter J. Klim, Deerfield Beach; Avery M. Lyford, Boca Raton; Dennis L. Moeller, Delray Beach, all of Fla.

[73] Assignee: International Business Machines Corp., Armonk, N.Y.

[21] Appl. No.: 825,336

[22] Filed: Jan. 23, 1992

Related U.S. Application Data

[63] Continuation of Ser. No. 431,275, Nov. 3, 1989, abandoned.

[51] Int. Cl.⁵ .............................................. G06F 9/46
[52] U.S. Cl. .................................................. 395/725
[58] Field of Search ............... 395/200, 800, 275, 725

[56] References Cited

U.S. PATENT DOCUMENTS

| | | |
|---|---|---|
| 3,828,325 | 8/1974 | Stafford et al. |
| 4,275,458 | 6/1981 | Khera |
| 4,441,154 | 4/1983 | McDonough et al. ............. 364/200 |
| 4,761,732 | 8/1988 | Eldumiati et al. |
| 4,805,096 | 2/1989 | Crohn |
| 4,823,076 | 4/1989 | Haines et al. .................... 324/121 R |
| 4,890,219 | 12/1989 | Heath et al. ........................ 364/200 |
| 4,952,817 | 8/1990 | Bolan et al. ........................ 307/39 |
| 5,101,497 | 3/1992 | Culley et al. ....................... 395/725 |
| 5,133,056 | 7/1992 | Miyamori .................. 395/5,161,228 |
| 5,161,725 | 11/1992 | Yasui et al. ........................ 395/725 |

OTHER PUBLICATIONS

Eggebrecht L., "Interfacing to the IBM Personal Computer", 1990 pp. 138–143.
U.S. Patent Appln. Ser. No. 07/029,511, filed Mar. 24, 1987.
English abstract of a German technical article re Intel 8259 and KP580 BH59.
Article entitled "68008 μP uses 8259A for interrupts", EDN Feb. 5, 1987 (p. 187).
IBM Technical Disclosure Bulletin, vol. 29, No. 6, Nov. 1986, pp. 2380–2381.
IBM Technical Disclosure Bulletin, vol. 30, No. 6, Nov. 1987, pp. 284–285.
EISA article "Introduction of the Extended Industry Standard Architecture" dated Sep. 13, 1988.
EISA article "Extended Industry Standard Architecture—Technical Synopsis".
Intel document "82350 EISA Compatible Peripheral Chip Set—Technical Overview Presentation".
Press Release Statement for EISA dated Sep. 13, 1988.

*Primary Examiner*—Dale M. Shaw
*Assistant Examiner*—D. Dinh
*Attorney, Agent, or Firm*—Martin J. McKinley; John B. Conklin

[57] ABSTRACT

A programmable interrupt controller having a plurality of interrupt request inquest inputs and an interrupt request output for connection to a central processing unit (CPU) includes means for interrupting the CPU over the interrupt request output responsive to an interrupt request from any one of the interrupt request inputs and a priority resolver for assigning a priority position to each of the interrupt request inputs to create an interrupt priority hierarchy. The interrupt controller is programmable such that each interrupt request input may be independently established as responsive to either edge-triggered or level-triggered interrupt requests on a per interrupt basis. An initialization command word register of the interrupt controller has a bit corresponding to each of the interrupt request inputs. Programming each of the bits of the register to one of two states determines whether corresponding interrupt request inputs are edge-sensitive or level-sensitive.

20 Claims, 10 Drawing Sheets

FIG. 9A

| | 7 | 6 | 5 | 4 | 3 | 2 | 1 | 0 |
|---|---|---|---|---|---|---|---|---|
| 100 — ICW1 | $A_7$ | $A_6$ | $A_5$ | 1 | LEVEL/EDGE | ADI | $S/\bar{C}$ $\phi$ | IC4 1 |
| 102 — ICW2 | $A_{15}$ | $A_{14}$ | $A_{13}$ | $A_{12}$ | $A_{11}$ | $A_{10}$ | $A_9$ | $A_8$ |
| 104 — ICW3 | $S_7$ | $S_6$ | $S_5$ | $S_4$ | $S_3$ | $S_2$ | $S_1$ | $S_\phi$ |
| 106 — ICW4 | $\phi$ | $\phi$ | $\phi$ | SFNM | BUF 1 | $M/\bar{S}$ 1 | AEOI | $\mu PM$ $\phi$ |
| 108 — ICW5 | IRQ7 L/E | IRQ6 L/E | IRQ5 L/E | IRQ4 L/E | IRQ3 L/E | IRQ2 L/E | IRQ1 L/E | IRQ0 L/E |

CASCADE MODE MCS-80/85
BUFFERED MODE (MASTER)

FIG. 9B

| | 7 | 6 | 5 | 4 | 3 | 2 | 1 | $\phi$ |
|---|---|---|---|---|---|---|---|---|
| 100 — ICW1 | $\phi$ | $\phi$ | $\phi$ | 1 | L/E | ADI | $S/\bar{C}$ $\phi$ | IC4 1 |
| 102 — ICW2 | $T_7$ | $T_6$ | $T_5$ | $T_4$ | $T_3$ | $\phi$ | $\phi$ | $\phi$ |
| 104 — ICW3 | $S_7$ | $S_6$ | $S_5$ | $S_4$ | $S_3$ | $S_2$ | $S_1$ | $S_\phi$ |
| 106 — ICW4 | $\phi$ | $\phi$ | $\phi$ | SFNM | BUF 1 | $M/\bar{S}$ 1 | AEOI | $\mu PM$ 1 |
| 108 — ICW5 | IRQ7 L/E | IRQ6 L/E | IRQ5 L/E | IRQ4 L/E | IRQ3 L/E | IRQ2 L/E | IRQ1 L/E | IRQ0 L/E |

CASCADE MODE 8086/88
BUFFERED MODE (MASTER)

FIG. 9C

| | 7 | 6 | 5 | 4 | 3 | 2 | 1 | $\phi$ |
|---|---|---|---|---|---|---|---|---|
| 100 — ICW1 | $A_7$ | $A_6$ | $A_5$ | 1 | L/E | ADI | $S/\bar{C}$ $\phi$ | IC4 1 |
| 102 — ICW2 | $A_{15}$ | $A_{14}$ | $A_{13}$ | $A_{12}$ | $A_{11}$ | $A_{10}$ | $A_9$ | $A_8$ |
| 104 — ICW3 | $\phi$ | $\phi$ | $\phi$ | $\phi$ | $\phi$ | $ID_2$ | $ID_1$ | $ID_\phi$ |
| 106 — ICW4 | $\phi$ | $\phi$ | $\phi$ | SFNM | BUF 1 | $M/\bar{S}$ $\phi$ | AEOI | $\mu PM$ $\phi$ |
| 108 — ICW5 | IRQ7 L/E | IRQ6 L/E | IRQ5 L/E | IRQ4 L/E | IRQ3 L/E | IRQ2 L/E | IRQ1 L/E | IRQ0 L/E |

CASCADE MODE MCS 80/85
BUFFERED MODE (SLAVE)

| | 7 | 6 | 5 | 4 | 3 | 2 | 1 | 0 |
|---|---|---|---|---|---|---|---|---|
| ICW 1 | $A_7$ | $A_6$ | $A_5$ | 1 | L/$\bar{E}$ | ADI | S/$\bar{C}$ 1 | IC4 1 |
| ICW 2 | $A_{15}$ | $A_{14}$ | $A_{13}$ | $A_{12}$ | $A_{11}$ | $A_{10}$ | $A_9$ | $A_8$ |
| ICW 4 | 0 | 0 | 0 | SFNM | BUF 0 | M/$\bar{S}$ | AEOI | μPM 0 |
| ICW 5 | IRQ7 L/$\bar{E}$ | IRQ6 L/$\bar{E}$ | IRQ5 L/$\bar{E}$ | IRQ4 L/$\bar{E}$ | IRQ3 L/$\bar{E}$ | IRQ2 L/$\bar{E}$ | IRQ1 L/$\bar{E}$ | IRQ0 L/$\bar{E}$ |

SINGLE MODE MCS 80/85
NON-BUFFERED MODE

FIG. 9D

| | 7 | 6 | 5 | 4 | 3 | 2 | 1 | 0 |
|---|---|---|---|---|---|---|---|---|
| ICW 1 | $A_7$ | $A_6$ | $A_5$ | 1 | L/$\bar{E}$ | ADI | S/$\bar{C}$ 0 | IC4 0 |
| ICW 2 | $A_{15}$ | $A_{14}$ | $A_{13}$ | $A_{12}$ | $A_{11}$ | $A_{10}$ | $A_9$ | $A_8$ |
| ICW 3 | $S_7$ | $S_6$ | $S_5$ | $S_4$ | $S_3$ | $S_2$ | $S_1$ | $S_0$ |
| ICW 5 | IRQ7 L/$\bar{E}$ | IRQ6 L/$\bar{E}$ | IRQ5 L/$\bar{E}$ | IRQ4 L/$\bar{E}$ | IRQ3 L/$\bar{E}$ | IRQ2 L/$\bar{E}$ | IRQ1 L/$\bar{E}$ | IRQ0 L/$\bar{E}$ |

CASCADE MODE * MCS 80/85
* NON-BUFFERED MODE(** MASTER)

FIG. 9E

** DETERMINED BY STATE OF THE $\overline{SP}/\overline{EN}$
SIGNAL IN NON-BUFFERED MODE
(0 = SLAVE, 1 = MASTER)

* DEFAULT CONDITIONS WHEN
ICW4 NOT PROGRAMMED

PROGRAMABLE INTERRUPT CONTROLLER

This is a continuation of copending application Ser. No. 431,275 filed on Nov. 3, 1989, now abandoned.

TECHNICAL FIELD

This invention generally relates to a programmable interrupt controller for a computer system and, more particularly, to an interrupt controller having a plurality of interrupt request inputs, each of which may be programmed to detect either edge-triggered or level-triggered interrupt requests on a per input basis.

BACKGROUND ART

Many computer systems are designed to interface with one or more peripheral devices. A computer system typically includes a central processing unit (CPU) connected to a system bus having data, address, and control lines. The bus is connected to other computer system components, such as program memory, and also to peripheral devices via a suitable interface. The interface may include interface devices for translating voltages or signal formats for compatibility between the computer system and the peripheral devices. Suitable interface connectors are often employed. Communication between the CPU and the peripheral devices can include sensory or command information. Specifically, a peripheral device acting as a sensor may produce data signals indicative of parameters the peripheral sensing device is sensing, such as temperature, voltage, or other parameters. The data signals may be translated to a suitable form and read through the interface by the CPU to provide the CPU with needed data regarding the sensed parameters. Alternatively, the peripheral devices may be controllers. The CPU commands a peripheral controlling device by writing suitable commands through the interface to the peripheral controlling device. The device then takes suitable action in accordance with the command.

In a system including a plurality of peripheral devices, frequent or continuing communication between the CPU and the peripheral devices is often necessary. Various schemes have been used for keeping the CPU in touch with the peripheral devices. A first scheme is called polling. In a polling system, the CPU executes a polling routine at intervals of time. Typically, a hardware timer will cause the CPU to execute the polling routine periodically. During the polling routine, the CPU reads information from the peripheral devices indicating whether the status of a sensed parameter has changed or whether there is a need to send a command to the peripheral device. Depending on the information received from a given peripheral device during the polling routine, the CPU takes appropriate action, such as sending commands to the peripheral device or updating a record of the status of the peripheral device stored in computer system memory. Polling is commonly used in computer systems which interface with a large number of peripheral devices. However, polling has the disadvantage that the polling routine must be executed frequently, thereby consuming a large amount of CPU processing time. In many instances, the status information read from the peripheral devices indicates that no action is necessary. Thus, the time spent executing the polling routine in retrospect proves to be unproductive. In computer system involving a great deal of activity or real-time applications, the time spent repeating the polling routine can reduce processing efficiency.

As an alternative to polling, computer systems often service peripheral devices by means of interrupts. In an interrupt system, a peripheral device sends a signal called an interrupt request when a condition is detected requiring some type of action by the CPU. Many CPUs are designed to include interrupt request input lines. A CPU having such an interrupt request input responds to a predetermined voltage signal on the interrupt request line by executing an interrupt service routine. Thus, an interface between a CPU and a peripheral device can include circuitry which detects a change of status in the peripheral device for which service is required and provides a suitable interrupt request signal to the CPU.

An interrupt driven system of this type provides improved processing efficiency since interrupt routines are executed only when required. However, frequently a CPU will be employed to service a plurality of peripheral devices. In such a system, questions arise as to how to go about determining which peripheral device needs to be serviced in response to an interrupt request. Also, if several peripheral devices simultaneously provide interrupt request signals, there must be a way of determining which one is serviced first. In order to provide practical answers to these questions, programmable interrupt controllers have been designed and utilized in conjunction with computer systems. An interrupt controller typically has a single interrupt request output which is connected to the interrupt request input of the CPU. The interrupt controller also has a plurality of interrupt request inputs. Each interrupt request input in connected to a peripheral device. Thus, when the peripheral device requires servicing, it produces a suitable interrupt request signal which is received by the interrupt controller. The interrupt controller then interrupts the CPU and causes a suitable interrupt service routine to be executed.

A well known example of an interrupt controller is the 8259A programmable interrupt controller manufactured by Intel Corporation. The 8259A is designed to operate with two different types of microprocessors which support multiple interrupt request inputs in two different ways. The first type is exemplified by the Intel 8080/8085 microprocessors which service interrupt requests by executing a software instruction for calling a subroutine which has as an operand an address of a subroutine. The second type is exemplified by the Intel 8086 microprocessor which services interrupt requests by using an 8-bit vector to select an interrupt service routine address from a table of addresses stored in a contiguous page of memory. Depending on which type of microprocessor the 8259A is programmed for, in response to an interrupt request input, the 8259A will interrupt the CPU and provide either a subroutine call instruction followed by an interrupt service routine address or an eight bit interrupt vector over the system bus to the CPU. Thus, in either case, the 8259A provides the CPU with information as to which interrupt service routine to execute, thereby ensuring that the CPU services the peripheral device which requested the interrupt in a suitable manner.

The 8259A may be configured to detected interrupt requests on its interrupt request inputs as either low-to-high voltage transitions or as high voltage levels. In other words, the 8259A interrupt request inputs can be configured as either edge-triggered or level-triggered. Many peripheral devices have been designed to produce edge-triggered interrupt request signals in the form of low-to-high voltage transitions. Specifically, an edge-triggered interrupt request is a transition from a recognizably low voltage to a recognizably high voltage within a predetermined time limit. However, peripheral devices which request service by means of high voltage levels are becoming more common. It is desirable for an interrupt controller to be able to detect level-triggered interrupts to allow for the use of peripheral devices which produce level-triggered interrupt requests, thereby providing for greater flexibility in interface design. It is desirable for a computer system including an interrupt controller to be flexible enough to accommodate the newer peripheral devices producing level-triggered interrupt requests while remaining backward compatible with older peripheral devices which produce edge-triggered interrupt requests.

However, programmable interrupt controllers to date have had the drawback that all interrupt request inputs are configured in the same manner. Typically, a single edge/level configuration control bit is used to program all interrupt request inputs to be either edge-triggered or level-triggered. This drawback has resulted in the disadvantage that upgrading a system to include peripheral devices producing level-triggered interrupt requests has required that all peripheral devices be so updated. It is not practicable to employ a mix of level-triggered peripheral devices and older edge-triggered peripheral devices. Decreased flexibility and increased user costs have resulted.

DISCLOSURE OF THE INVENTION

An object of the invention is to provide a programmable interrupt controller which detects edge-triggered and level-triggered interrupt requests from peripheral devices on a per peripheral device basis.

It is a further object of the invention to provide an interrupt controller for a computer system which allows for the peripheral devices in the group to be replaced or upgraded in a manner which may include changing the mix of edge-triggered and level-triggered interrupt requests while preserving the system's ability to service the peripheral devices.

It is a related object of the invention to provide an interrupt controller for a computer system capable of servicing interrupt requests from any particular mix of peripheral devices having edge-triggered and level-triggered interrupt requests without regard to the address location of each device. In other words, each peripheral can have either edge-triggered or level-triggered interrupt requests, and the interrupt controller accommodates edge-triggered and level-triggered interrupts on a per interrupt line basis.

It is another object of the invention to provide a programmable interrupt controller in accordance with the above objects which may be programmed in accordance with currently existing software written for previously existing programmable interrupt controllers. If the controller is so programmed, all inputs shall detect either edge-triggered interrupt requests or level-triggered interrupt requests so that a controller in accordance with the invention operates in a manner consistent with such previously existing programmable interrupt controllers. Thus, the controller is backward compatible with existing computer systems.

It is a further object of the invention to provide a computer system including a programmable interrupt controller in accordance with the above objects.

It is a still further object of the invention to provide a method for receiving and servicing edge-triggered and level-triggered interrupts.

In order to meet the above objects, there is provided in accordance with the invention a programmable interrupt controller for use in a computer system comprising a plurality of inputs connected to receive interrupt requests from a group of peripheral devices, an interrupt request output connected to the CPU, means for interrupting the CPU by sending an interrupt signal over the interrupt request output responsive to any interrupt request received over an interrupt request input to cause the CPU to service the interrupt request, a priority resolver for assigning each input a priority position in said plurality of inputs to create a hierarchy for the purpose of resolving which interrupt request is first serviced when time overlapping interrupt requests are received and means for independently establishing each input to be responsive to either edge-triggered or level-triggered interrupt requests.

Additionally in accordance with the invention there is provided a method for receiving and servicing an edge-triggered interrupt request from a first source and a level-triggered interrupt request from a second source comprising the steps of programming an interrupt controller having first and second interrupt request inputs to detect edge-triggered interrupt requests incoming over the first interrupt request input and to detect level-triggered interrupt requests incoming over the second interrupt request input, said programming being done on a per input basis, detecting and latching an edge-triggered interrupt request incoming over the first input, interrupting the CPU to cause the CPU to service the edge-triggered interrupt request, detecting a level-triggered interrupt request incoming over the second input, and interrupting the CPU to cause the CPU to service the level-triggered interrupt request.

A programmable interrupt controller in accordance with the invention advantageously provides flexibility in designing and implementing computer systems in that peripheral devices utilizing either edge-triggered or level-triggered interrupt requests may be used on the various interrupt request inputs. Also, such peripheral devices are interchangeable. Replacing an edge-triggered peripheral device with a level-triggered peripheral device merely requires changing the programming configuration of the interrupt controller. Thus, a computer system may be upgraded with new level-triggered peripheral devices without incurring undesirably high costs for replacing otherwise functional peripheral devices.

A method in accordance with the claimed invention advantageously provides programming flexibility and convenience in computer system design and also facilitates system upgrades generally as described in conjunction with the interrupt controller.

These and other objects, features, and advantages of the invention will be more fully appreciated with reference to the accompanying figures.

BRIEF DESCRIPTION OF THE DRAWINGS

FIGS. 9A-9E are tables showing how the initialization control word registers of the preferred embodiment of the programmable interrupt controller may be programmed for various system configurations.

BEST MODE FOR CARRYING OUT THE INVENTION

Figure 1:
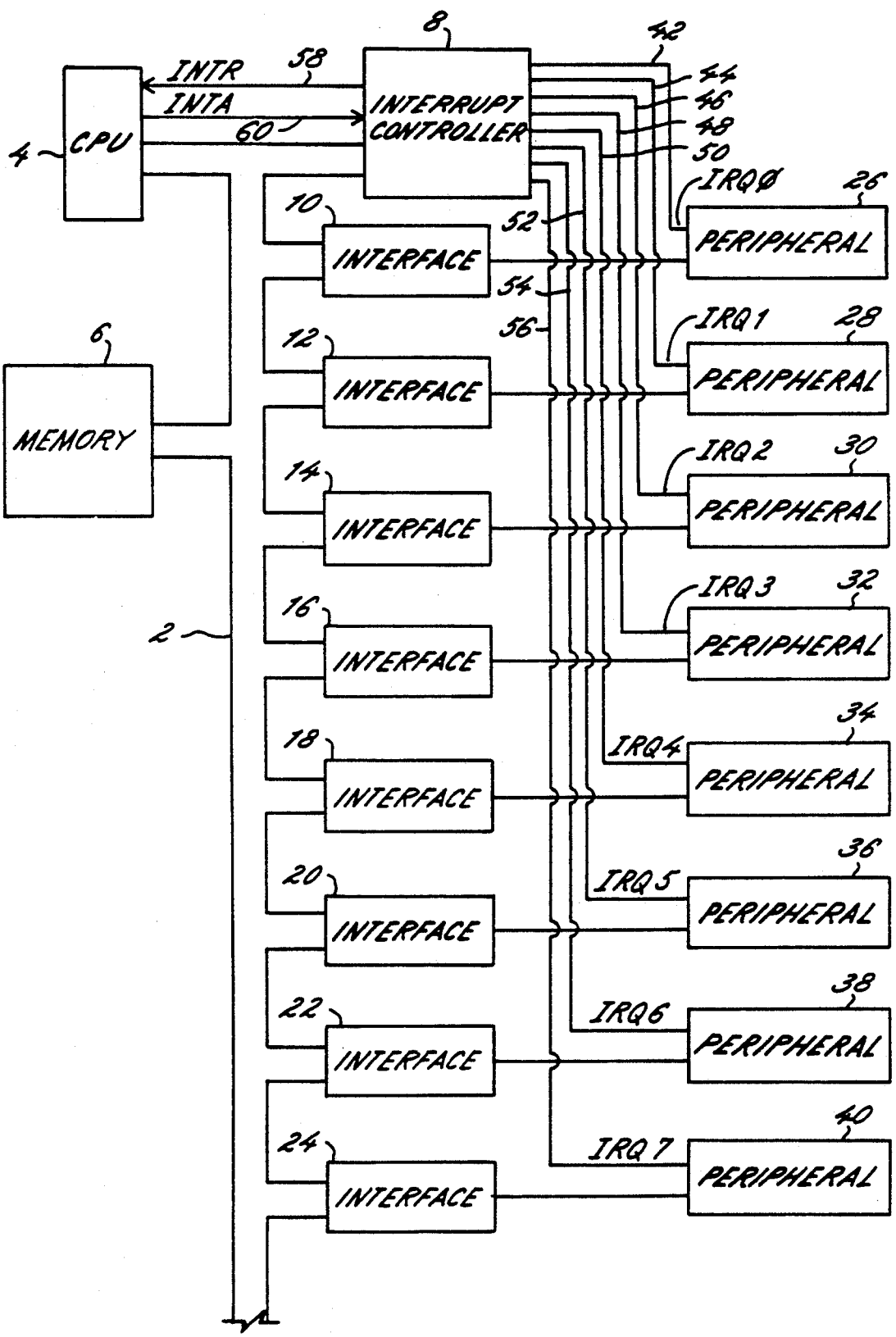
FIG. 1 is a block diagram of a computer system utilizing an interrupt controller in accordance with the invention for servicing peripheral devices.

Referring to FIG. 1, there is depicted a computer system employing an interrupt controller in accordance with the invention. A computer system bus 2 is connected to a central processing unit (CPU) 4, memory 6, an interrupt controller 8, and a plurality of interfaces 10-24. The interfaces 10-24 may be any type of suitable shared boundary and may include electronic interface devices, such as universal asynchronous receivers/transmitters (UARTS) and suitable connectors. The interfaces 10-24 are connected to peripheral devices 26-40 which may be sensing or monitoring devices, such as thermocouples or voltage sensors, or control devices, such as motors, electronic switches, or other devices, suitable for computer controlled applications. The peripheral devices 26-40 have interrupt request outputs which are connected via lines 42-56 to interrupt request inputs on the interrupt controller 8. The interrupt controller 8 includes an interrupt request output connected via a line 58 to an interrupt request input on the CPU 4. An interrupt acknowledge line 60 is connected to carry an interrupt acknowledge signal from the CPU 4 back to the interrupt controller 8. Typically, the lines 58, 60 are treated as part of a system bus including data, address, and control lines. For the purpose of illustration, however, FIG. 1 shows the interrupt request line 58 and the interrupt acknowledge line 60 running between the interrupt controller 8 and the CPU 4 as separate lines.

Figure 2:
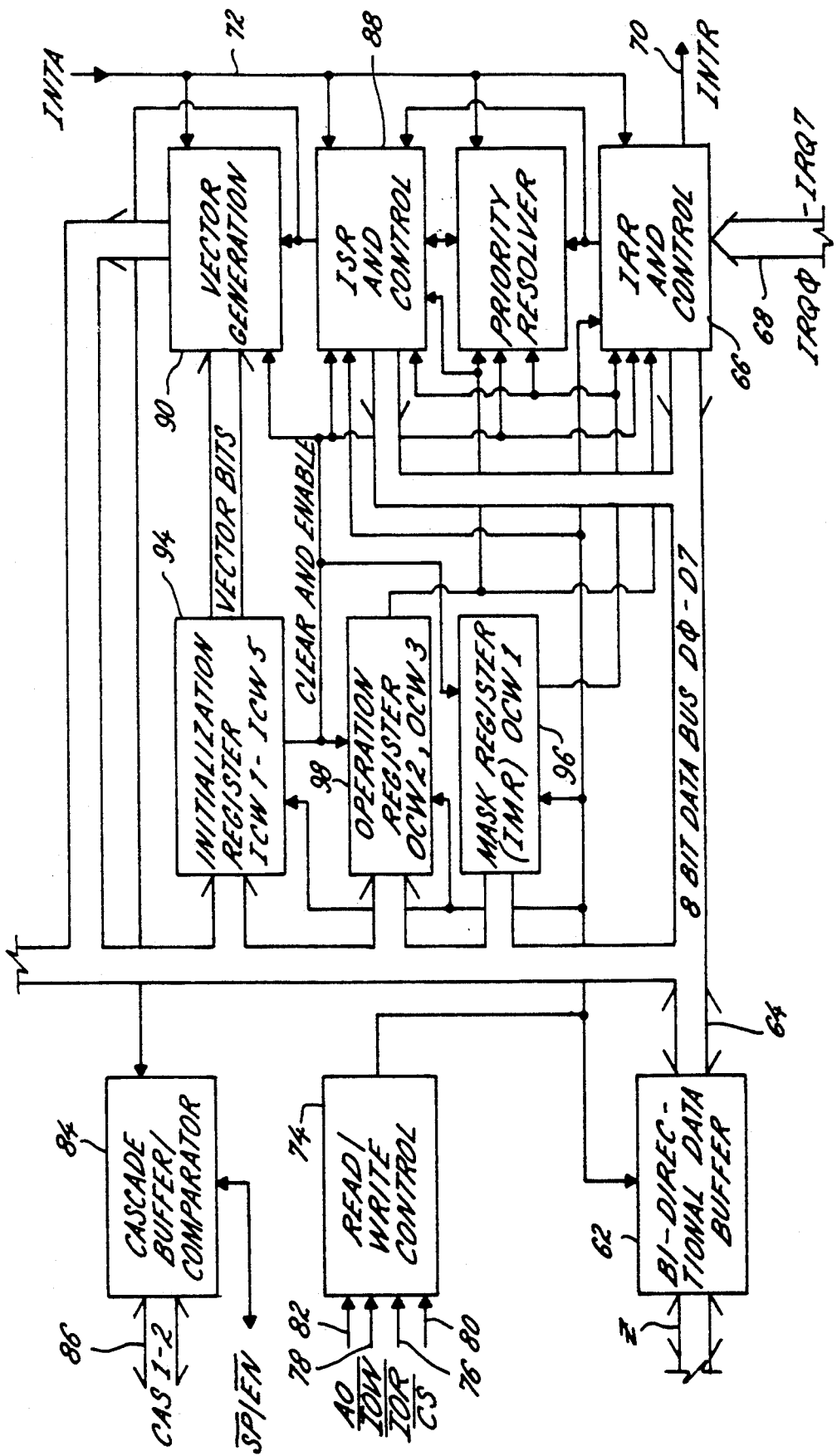
FIG. 2 is a block diagram of an interrupt controller in accordance with the invention.

FIG. 2 shows a more detailed diagram of the interrupt controller 8. A data bus buffer 62 provides an interface between the system data bus 2 (FIG. 1) and an internal data bus 64. An interrupt request register (IRR) 66 is connected to the data bus 64 and has eight interrupt request inputs collectively shown as 68. The interrupt request inputs 68 are individually designated IRQ$_0$-IRQ$_7$. The IRR 66 has an interrupt request output INTR 70 which is connected to the line 58 shown in FIG. 1. In addition, the embodiment depicted in FIG. 2 includes an interrupt acknowledge input INTA 72 connected to the interrupt acknowledge line 60 from the CPU 4. To permit the CPU 4 to select the interrupt controller 8 and write to and read from the controller 8, a read/write control module 74 is provided having read and write inputs ($\overline{IOR}$, $\overline{IOW}$) 76, 78, a chip select input ($\overline{CS}$) 80, and an address select input (A$\emptyset$) 82. To permit a plurality of interrupt controllers to be cascaded in a single computer system, a cascade control 84 is provided having a three bit cascade bus (CAS) 86 which is an output when the controller is used as a master and an input when the controller is used as a slave.

Also shown in FIG. 2 is an in service register (ISR) 88. The ISR 88 stores a bit corresponding to each interrupt request input 68. Bits in the ISR 88 are set to indicate which interrupt levels are being serviced. The IRR 66 generates an interrupt request which is delivered to the CPU 4 over the interrupt request line 70. An acknowledgement from the CPU 4 is received over the interrupt acknowledge line 72 by the IRR 66, the ISR 88, a vector generator 90, and a priority resolver 92, all of conventional design.

The interrupt controller 8 also includes a series of initialization command word (ICW) registers, collectively shown as 94, which are written into by the CPU 4 through the data bus buffer 62 and the internal data bus 64 upon initialization. In a conventional manner, the ICW registers 94 provide vector bits to the vector generator 90 which, in turn, presents a suitable interrupt vector or service routine address onto the internal data bus 64. The priority resolver 92 assigns each of the interrupt request inputs (IRQ$_0$-IRQ$_7$) 68 a priority position with respect to the other inputs 68 to create a hierarchy for resolving which interrupt request is serviced first when simultaneous or time overlapping interrupt requests are received by the IRR 66. Any suitable priority scheme may be used. As a first example, priority may be fixed in a given order. As a second example, priority may rotate, i.e., an input may go to the bottom of the priority hierarchy after it has been serviced. Finally, operation command word (OCW) registers OCW1, OCW2, and OCW3 cause the interrupt controller 8 to operate in various modes in a well known manner. OCW1 is stored in a mask register 96. The bits of the OCW1 register serve to mask selected ones of the IRQ inputs 68. OCW2 and OCW3 are stored in an operation register 98 and provide other operational modes.

Figure 3:
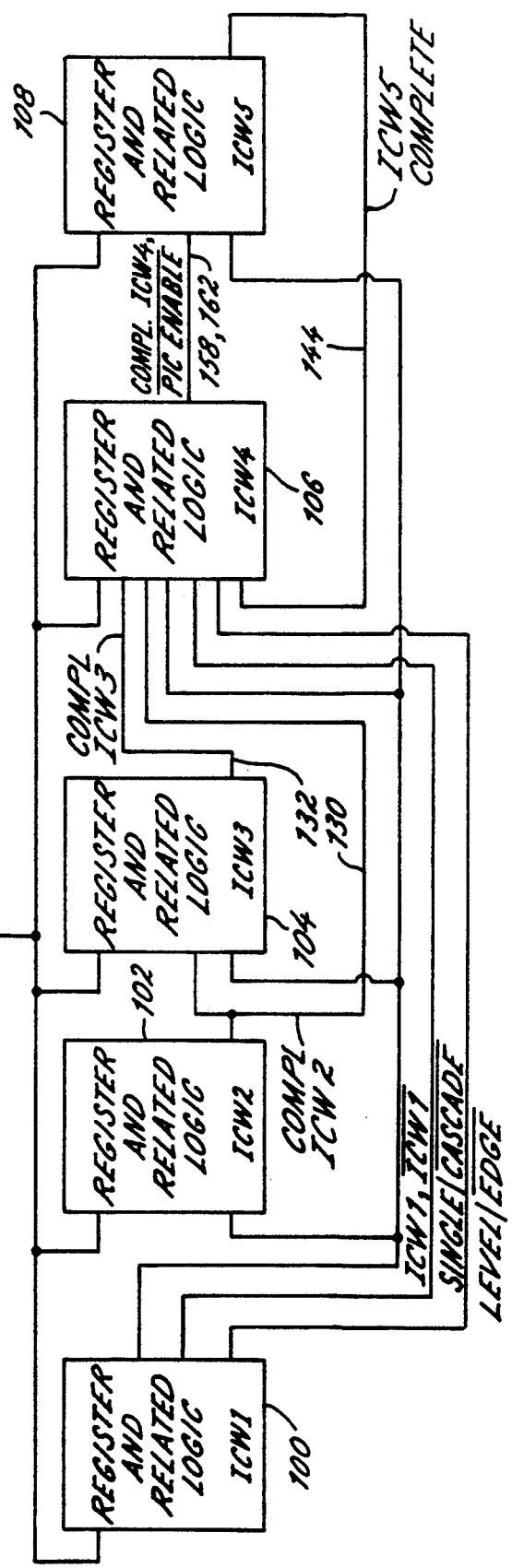
FIG. 3 is a logic diagram showing a hardware configuration of initialization control word registers utilized in a preferred embodiment of the invention.

The ICW registers 94 are depicted in more detail in FIG. 3. The registers include ICW1 (shown as 100), ICW2 (shown as 102), ICW3 (shown as 104), ICW4 (shown as 106, and ICW5 (shown as 108). In FIG. 3, the ICW registers 94 are shown in block diagram along with certain interconnections. Still more detailed drawings, including additional logic used to interconnect the registers, are provided and discussed below. While the following discussion illustrates a preferred embodiment in terms of various functions controlled by bits in these registers, it is to be understood that an interrupt controller in accordance with the spirit and scope of the invention may include varying numbers of registers and may make bit assignments for functions, such as those described below, in arrangements different from the present embodiment. Also, individual bits may be defined differently as long as the overall device functions in a manner essentially consistent with the spirit and scope of the invention. The ICW registers 94 are programmed during initialization by the CPU 4 which writes values into the registers to set bits so as to configure the interrupt controller 8 in a desired fashion. Examples of ICW programming for various configurations are shown in FIGS. 9A-9E and the related text. In the present embodiment, the ICW registers 94 are written into in sequence. Alternatively, the ICW registers 94 could be separately addressable for reading and writing in any desired sequence. Each register produces a signal indicating that it has been written into. In FIG. 3, these signals are indicated as ICW1/ICW1, COMPL ICW2, COMPL ICW3, COMPL ICW4 AND ICW5 COMPLETE. These signals are used to enable writing into the subsequent registers. While all of the ICW 94 registers are used for completely configuring the interrupt controller 8, certain registers contain bits which are particularly relevant to the disclosed embodiment. These registers are described in more detail below.

FIG. 3 may be taken as a summary of the more detailed subject matter appearing below. The architecture of the preferred embodiment as depicted in FIG. 3 is similar in many respects to the Intel 8259A programmable interrupt controller referred to above. In particular, the ICW1, ICW2, ICW3, and ICW4 registers 100, 102, 104, 106 are substantially similar to comparable registers in the 8259A. Points of distinction between these registers as used in the 8259A and in the present preferred embodiment are noted below.

The ICW5 register 108 is a novel feature of the present embodiment. Since an objective of the present invention is to provide a programmable interrupt controller in which a plurality of interrupt request inputs may be programmed to be either edge-sensitive or level-sensitive on a per interrupt basis, the ICW5 register 108 includes a bit corresponding to each interrupt request input. Each bit may be programmed in one of two states, the two states corresponding respectively to edge-sensitivity and level-sensitivity. Thus, in accordance with the invention, a user may program an interrupt controller as depicted in FIG. 3 to provide the desired per interrupt selectability of edge-triggering or level-triggering.

With this in mind, it will be seen that a programmable interrupt controller in accordance with the invention need not follow this exact architecture. Different types of interrupt controllers will have different types of programming characteristics. It may be that configuration parameters in other interrupt controllers may be programmed in a manner other than through the use of control registers. Also, similar configuration parameters may be defined in terms of different programmable bits from those described below in conjunction with the initialization control registers. However, any such programmable interrupt controller will fall within the spirit and scope of the present invention if a plurality of interrupt request inputs may be programmed on a per interrupt basis for edge-sensitivity or level-sensitivity, either through the use of a register such as the ICW5 register 108 or through other suitable means.

As will be described below, backward compatibility with the Intel 8259A is provided by using a LEVEL-/EDGE bit. While the 8259A uses this single bit to program all interrupt request inputs to be either edge-sensitive or level-sensitive, the present preferred embodiment uses this same bit to select either edge-sensitivity for all interrupt request inputs or selectability on a per interrupt basis through the use of the bits in the ICW5 register 108. This use of the LEVEL/EDGE bit in this manner is an additional novel feature of the present invention. While it is defined in the present preferred embodiment to provide backward compatibility with the Intel 8259A, other programmable interrupt controllers might provide backward compatibility with previously existing interrupt controllers in an essentially analogous manner by adapting the definition of their own configuration parameters in a suitable fashion.

In addition, FIG. 3 shows various system signals which are provided to all of the initialization command word registers. These signals are all essentially conventional in nature. They are standard computer system data, address, and control bus signals. For instance, the lines DATA0-DATA7 are data bus lines. They are individual lines which together make up the eight bit data bus 64 shown in FIG. 2. The line A0 is the least significant bit of a conventional address bus. Many large scale integrated circuits, such as interface devices and interrupt controllers, may be programmed through the use of memory-mapped input/output. This is a conventional programming technique in which one or more memory addresses are used to program a peripheral device, such as an interface device or an interrupt controller. Where one or more address inputs are designed into the device, system address bus lines may be connected in hardware to these inputs to provide addressability through software programming. Finally, the signals I/O WRITE PULSE, CCLK, and BCLK are conventional control signals. In particular, the present preferred embodiment utilizes two separate clock signal CCLK and BCLK. Typically, a plurality of clock signals may be used if they have a given phase relationship between each other. In other conventional systems, a single clock may be used.

Figure 4:
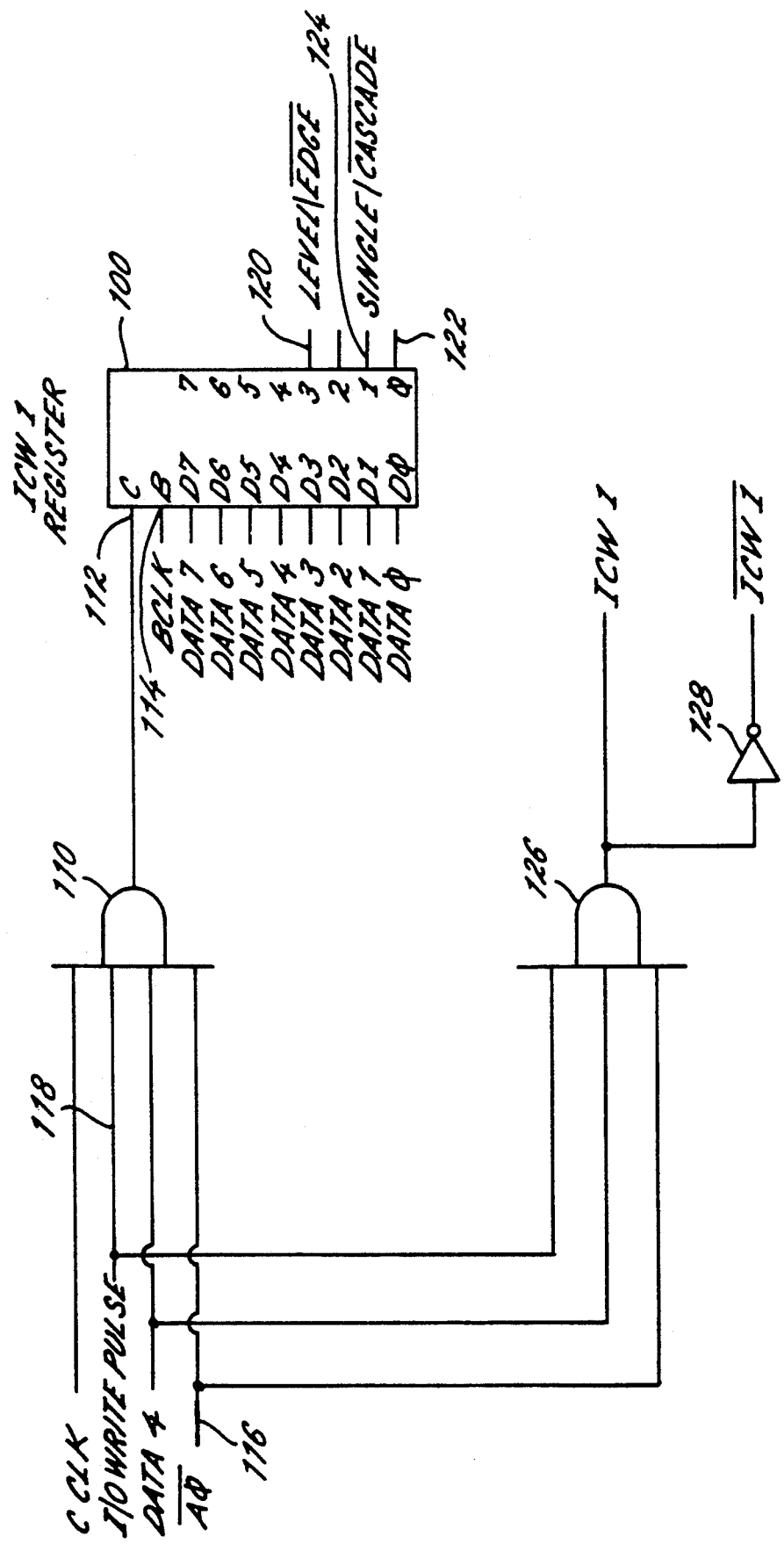
FIGS. 4-6 are detailed logic diagrams of various initialization control word registers shown in FIG. 3.

Turning to FIG. 4, a more detailed drawing is provided showing the ICW1 register 100 and logic utilized for writing into it. Writing into the ICW1 register 100 is facilitated by means of the system clocks BCLK and CCLK. An AND gate 110 is provided for enabling the system CCLK to reach a C input 112 of the ICW1 register 100 under suitable conditions. A B input 114 of the ICW1 register 100 is connected directly to the system BCLK. To permit the CPU to address individual registers within the interrupt controller 8, an address line AØ 116 must be high as well as an I/O WRITE PULSE 118. When a data line DATA4 of the data bus 64 is high, the command is interpreted as being directed to the ICW1 register 100. Accordingly, DATA4 is also connected to the AND gate 110.

Data bits on the data bus 64 are written into the ICW1 register 100 in a conventional fashion to provide various defined signals representing a desired configuration of the interrupt controller. In accordance with the preferred embodiment of the invention, the Bit 3 of the ICW1 register is the LEVEL/EDGE bit 120. In the 8259A interrupt controller, a corresponding bit defines whether all of the interrupt request inputs were level-sensitive or edge-sensitive. In the present embodiment of the invention, the function of the LEVEL/EDGE bit 120 has been modified to provide backward compatibility with the 8259A as well as selectability on a per interrupt basis in accordance with the invention. When the LEVEL/EDGE bit 120 is low, all interrupt request inputs are edge-sensitive. When the LEVEL/EDGE bit 120 is high, interrupt request inputs are programmable on a per interrupt basis to be either edge-sensitive or level-sensitive. Exactly how each interrupt request input is programmed for detecting interrupt requests in described below in conjunction with the ICW5 register 108. Defining bit 3 of the ICW1 register 100 in this manner is a practical manner for implementing the invention while also providing backward compatibility. Since many older systems employing the 8259A use peripheral devices producing edge-triggered interrupt requests, system software for configuring the 8259A would typically program bit 3 of the ICW1 register 100 to be low for edge-triggering. Thus, an interrupt controller in accordance with the invention programming this bit to be low would operate in the same manner as an 8259A. On the other hand, newer systems employing newer level-triggered peripheral devices and an interrupt controller in accordance with the invention could easily program the LEVEL/EDGE bit 120 high, thereby providing interrupt selectability on a per interrupt basis.

For implementing an interrupt controller in accordance with the invention having backward compatibility, the implementation as described above is deemed to be the best mode for carrying out the invention. However, it will be understood that other ways of implementing edge-triggered and level-triggered interrupts are within the scope and spirit of the invention. For instance, the LEVEL/EDGE bit 120 could be implemented such that the high value would configure all interrupt request inputs to be level-sensitive and a low value would permit per input selectability. Alternatively, the LEVEL/EDGE bit 120 could be ignored and each interrupt request input would always be configured in accordance with a corresponding bit in ICW5 as described below. Also, the state of the LEVEL/EDGE bit 120 could be reversed, i.e., a high state could correspond with edge-sensitive interrupt requests. Then it would be an EDGE/LEVEL bit.

Figure 5:
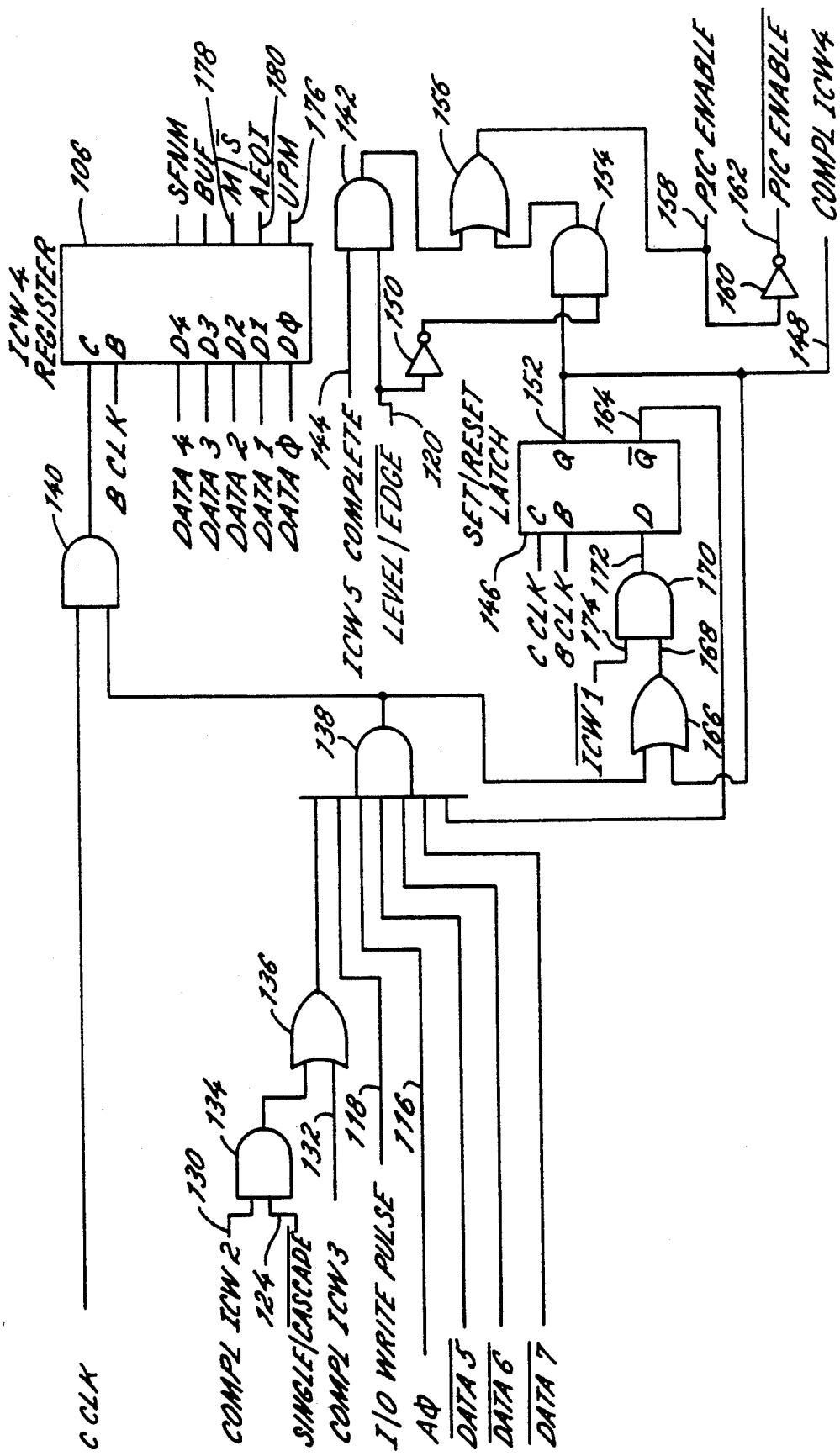

Bit 0 of the ICW1 register is an IC4 bit 122 When this bit is a 1, the ICW4 register 106 is programmed and its bits define interrupt controller parameters as discussed in conjunction with FIG. 5 and tabulated in FIGS. 9A-9E. If the IC4 bit 122 is 0, then the ICW4 register 106 is not programmed and the parameters are set to default values as described in conjunction with FIG. 9E which illustrates a case in which the IC4 bit 122 is low.

FIG. 4 also shows bit 1 of the ICW1 register 100 which is a SINGLE/CASCADE bit 124. This bit is utilized in a conventional manner when a plurality of interrupt controllers are used in a system. A master interrupt controller can be used with up to eight slave controllers, thereby permitting up to sixty-four interrupt request inputs at up to sixty-four priority levels to be handled. As shown in FIG. 2 and described earlier, the cascade control 84 has a three-bit cascade bus 86. If the cascade mode is selected by programming the SINGLE/CASCADE bit 124 low and the controller is configured as a master (as will be described later in conjunction with the ICW4 register 106), then the three lines making up the cascade bus 86 are outputs which are used to select one of up to eight slave controllers.

Also shown in FIG. 4 are an AND gate 126 and an inverter 128 which produce high-true and low-true versions of a signal ICW1. The AND gate 126 has inputs connected to receive the system I/O WRITE PULSE 118 as well as the address line A0 116 and the DATA4, the fourth bit of the data bus 64. Accordingly, the AND gate 126 outputs the signal ICW1 as a pulse synchronized with the I/O WRITE PULSE 118 when the ICW1 register 100 is written into. This signal ICW1 is used for clearing the remaining ICW registers when the programming sequence, beginning with the ICW1 register 100, commences, thereby enabling programming of the other registers in sequence.

Referring now to FIG. 5, there is disclosed the ICW4 register 106 and accompanying logic. As with the other registers, the ICW4 register 106 is clocked by means of the system BCLK and the system CCLK as enabled by an enabling logic network. Since, in accordance with the preferred embodiment, the ICW2 and/or ICW3 registers 102, 104 must be written as a prerequisite to writing the ICW4 register 106, the enabling logic network receives signals indicating the completion of writing into the registers 102, 104. The signals are called COMPL ICW2 and COMPL ICW3 and are shown in FIG. 3 as 130 and 132, respectively. Because they are of conventional configuration, the ICW2 and ICW3 registers 102, 104 have not been disclosed in detail in the present specification. The network includes an AND gate 134 connected to receive as inputs a signal COMPL ICW2 (indicating that the ICW2 register 102 has been programmed) and the SINGLE/CASCADE bit 124 of the ICW1 register 100. An OR gate 136 is connected to receive as inputs the output of the AND gate 134 and a signal COMPL ICW3, indicating that the ICW3 register 104 has been programmed. As shown in FIG. 13 and discussed hereinafter, in the single mode, the ICW3 register 104 is not programmed. Thus, programming the ICW4 register 106 may be enabled either by the completion of programming of the ICW3 register 104 or, in the single mode, by that of the ICW2 register 102.

The output of the OR gate 136 is connected to an input of an AND gate 138. The AND gate 138 produces an output which enables the system CCLK through an AND gate 140 to the ICW4 register 106 when all necessary prerequisites are met. An output from the OR gate 136 is one prerequisite. In addition, the I/O WRITE PULSE 118 and the address line A0 116 are prerequisites for enabling the CCLK to the ICW4 register 106. Finally, bits 5, 6, and 7 of the data bus 64, which are not used in the ICW4 register 106, must be low. These three data bits are shown as inverted in a conventional manner to accommodate the active high inputs of the AND gate 138.

Circuitry is also provided in FIG. 5 for enabling the programmable interrupt controller 8 upon completion of programming of all of the ICW registers. The controller 8 is enabled when the ICW5 register 108 has been programmed if the LEVEL/EDGE bit 120 is high. As will be shown below, the ICW5 register 108 is programmed to select edge-triggering or level-triggering on a per interrupt basis. If the LEVEL/EDGE bit 120 has been programmed low, all interrupt request inputs default to edge-sensitivity. Accordingly, an AND gate 142 is provided to enable the programmable interrupt controller 8 when the LEVEL/EDGE bit 120 is high and the ICW5 register 108 has been programmed, as indicated by an ICW5 COMPLETE signal 144.

A set/reset latch 146 is provided to indicate that the ICW4 register 106 has been written into by producing a signal COMPL ICW4, shown as 148. The output of the latch 146 is also used to indicate that programming of the interrupt controller 8 is completed. Where the LEVEL/EDGE bit 120 is low, indicating that the interrupt controller 8 defaults to a situation where all inputs are edge-sensitive, there is no need to program the ICW5 register 108. Accordingly, the interrupt controller 8 is ready to be enabled after the ICW4 register 106 has been programmed.

The LEVEL/EDGE bit 120 is inverted by an inverter 150 to indicate edge-triggering when high. A high true output 152 of the latch 146 is connected along with the inverted LEVEL/EDGE bit 120 to an AND gate 154. Outputs of the AND gates 142 and 154 are connected to inputs of an OR gate 156. The output of the OR gate 156 is a PIC ENABLE signal 158 which, when high, indicates that the programmable interrupt controller 8 is enabled. PIC ENABLE 158 is inverted by an inverter 160 to produce a PIC ENABLE signal 162 which is used where an active low signal indicating that the programmable interrupt controller is enabled is required.

The latch 146 is clocked by the system CCLK and BCLK. When the CPU 4 begins to program the ICW registers, a low value is clocked into the latch 146. Thus, a low-true output 164 of the latch 146 will be high, enabling the AND gate 138 which receives the ICW4 decoding signals. When ICW4 is written and the AND gate 138 goes high, an OR gate 166 goes high, raising a first input 168 of an AND gate 170, the output of which is connected to a data input 172 of the latch 146. A second input 174 of the AND gate 170 is connected to ICW1. ICW1 is normally high and goes low only at the time when the ICW1 register 100 is written into, thereby initiating the programming of the ICW registers. Accordingly, at the moment when the ICW1 signal goes low, a low value is clocked into the latch 146. The low-true output 164 of the latch 146 is high, enabling the AND gate 138. The high-true output 152 of the latch 146 goes low, so the OR gate 166 remains low until the output of the AND gate 138 goes high. The latch 146 is finally set at the time when the ICW4 register 106 is written since the output of the AND gate 138 goes high, enabling the CCLK through the AND gate 140 to the C input of the ICW4 register 106 and also raising the output of the OR gate 166, thereby raising the output of the AND gate 170 connected to the data input 172 of the latch 146. Thus, when the LEVEL/EDGE bit 120 is low, the PIC ENABLE signal 158 goes high at the time when the latch 146 is set as the ICW4 register 106 is being written into.

Also shown in FIG. 5 are various bits of the ICW4 register 106 indicating various aspects of the configuration of the interrupt controller 8. Generally speaking, these signals are defined in a manner consistent with the Intel 8259A. They are programmed by writing into the ICW4 register 106 with suitable values on the respective bits of the data bus 64. Of particular interest with respect to the disclosed embodiment are the following bits. A microprocessor mode (uPM) bit 176 is set according to which type of microprocessor the interrupt controller is working with. If the uPM bit 176 is low, the interrupter controller 8 will operate in accordance with an 8080 or 8085 microprocessor by providing a sixteen bit interrupt service routine address. If the uPM bit 176 is high, the interrupt controller 8 will operate in accordance with an 8086 microprocessor by providing an eight bit interrupt vector. A MASTER/SLAVE (M/S) bit 178 defines whether the interrupt controller 8 is a master or slave. This bit is used in the cascade mode in which interrupt request outputs of slave controllers are connected to interrupt request inputs of a master controller.

An automatic end of interrupt (AEOI) bit 180 may be programmed high to cause the programmable interrupt controller 8 to automatically perform a non-specific end of interrupt operation following the last interrupt acknowledge pulse received over the interrupt acknowledge line 72. The AEOI bit 180 may be used in a conventional manner in conjunction with rotating interrupt request priority. Rotate in automatic end of interrupt mode may be used.

Figure 6:
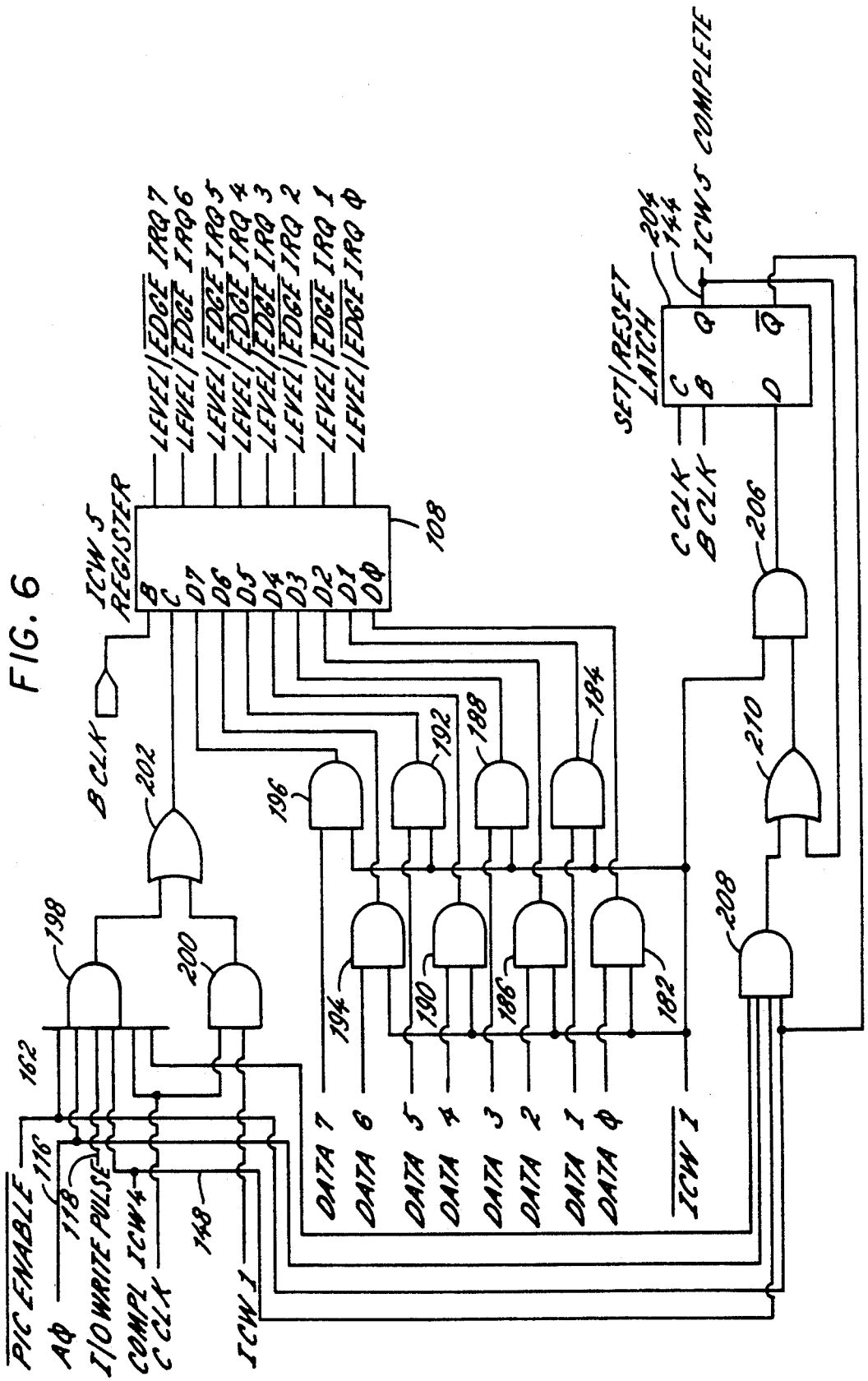

Referring now to FIG. 6, the ICW5 register 108 is shown. The ICW5 register 108 has eight data inputs, one corresponding to each interrupt request input. The data bus 64 is enabled through AND gates 182, 184, 186, 188, 190, 192, 194, 196, to each input of the ICW5 register 108. When the register 108 is written into, the bits on the data bus 64 are loaded into the register 108 to drive output signals LEVEL/EDGE IRQ$_0$–LEVEL/EDGE IRQ$_7$, thereby establishing on a per interrupt basis whether each input is level-sensitive or edge-sensitive.

Also shown in FIG. 6 is a logic network for enabling the system CCLK to the ICW5 register 108. PIC ENABLE 162 should be high, indicating that programming of the ICW registers 94 is in progress but not complete. COMPL ICW4 148 should be high, indicating that the ICW4 register 106 has been already written into. The circuitry shown includes an AND gate 198 for enabling the system CCLK through to the C input of the ICW5 register 108. The AND gate 198 receives the PIC ENABLE signal 162 and the COMPL ICW4 signal, as well as the address line A∅ 116 and the I/O WRITE PULSE 118.

Another AND gate 200 is connected to receive the system CCLK and the high-true ICW1 signal. Outputs of the AND gates 198, 200 are connected to inputs of an OR gate 202 having an output connected to the C input of the ICW5 register 108. The AND gate 200 is provided so that the ICW5 register 108 will be written into at the time that the ICW1 register 100 is written into. At that time, the AND gates 182, 184, 186, 188, 190, 192, 194, 196 are disabled by their respective inputs connected to the ICW1 signal, which is low. Since this signal is inactive, the outputs of the AND gates 182-196 are all low to clear all bits of the ICW5 register 108 at the time when the ICW1 register 100 is written into. This is done so that, if the LEVEL/EDGE bit 120 is low, all of the ICW5 bits will be cleared, thereby indicating that all interrupt request inputs will be edge-sensitive. Each gate has two inputs, one connected to a data bus line of the internal data bus 64 and the other connected to the ICW1 signal. ICW1 is low only when the ICW1 register 100 is being written into. Thus, at that time all the inputs to the ICW5 register 108 will be low. Similarly, the CCLK enabling logic includes the AND gate 200 having inputs connected to the ICW1 signal and the system CCLK. Thus, one clock pulse will be enabled through to the C input of the ICW5 register 108 at the time when the ICW1 register 100 is written into. Accordingly, it can be assured that all ICW5 bits will be cleared when the ICW1 register 100 is written into. If the ICW5 register 108 is subsequently written into, its final values will be established at that time. If not, all of the interrupt request inputs will be configured for edge-triggering.

Also shown in FIG. 6 is a set/reset latch 204 similar to the set/reset latch 146 shown in conjunction with the ICW4 register 106. The latch 204 is normally high but is cleared when the ICW1 register 100 is written into. This is done by means of an AND gate 206 having an output connected to the D input of the latch 204 and an input connected to ICW1. As stated above, ICW1 goes low when the ICW1 register 100 is written into. Thus, at that time a low value is clocked into the latch 204. The latch 204 is set when COMPL ICW4 148 goes high, indicating that the ICW4 register 106 has already been written into, and also when PIC ENABLE 162 is high, indicating that, although the ICW4 register 106 has been written into, the logic connected to the D input of the set/reset latch 146 in FIG. 5 has not enabled the programmable interrupt controller 8 as yet. These signals are input to an AND gate 208, the output of which goes high when all of the conditions described above are met. The AND gate 208 has an output connected to a first input of an OR gate 210. A second input of the OR gate 210 is connected to the output of the latch 204. Thus, once the latch goes high, the output of the OR gate 210 remains high even if the output of the AND gate 208 goes low. Thus, high values continue to be clocked into the latch 204 until the programming sequence is restarted by programming the ICW1 register 100. ICW1 goes low, the output of the AND gate 206 goes low, and a low value is clocked into the latch 204. The output of the OR gate 210 and the ICW1 signal are connected to inputs of the AND gate 206.

The foregoing has been a description of the initialization command word registers which, in the present embodiment, are implemented the programmable interrupt controller 8 and shown as 94 in FIG. 2.

Figure 7:
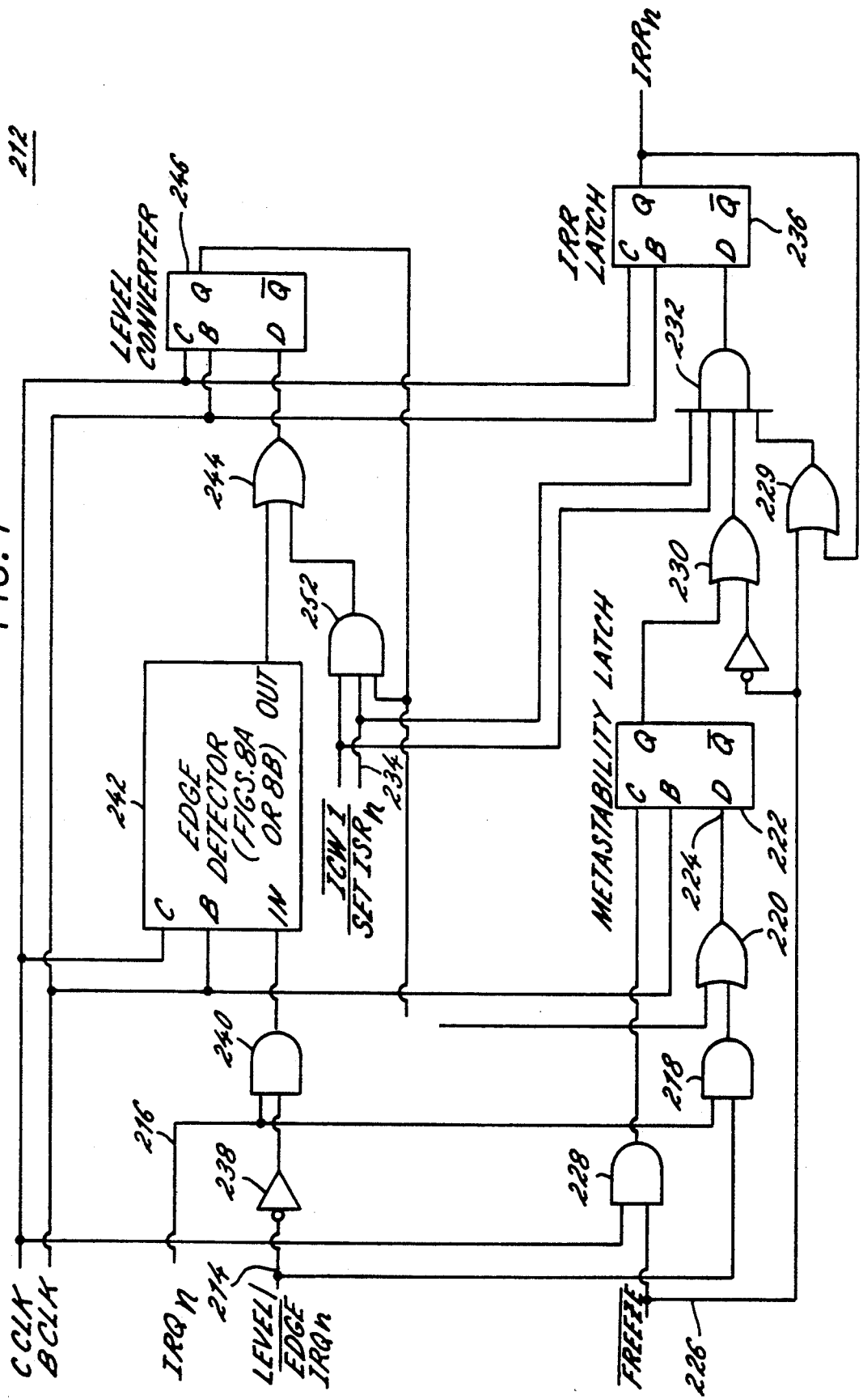
FIG. 7 is a detailed logic diagram showing a stage of the interrupt request register (IRR) shown in FIG. 2.

FIG. 7 shows a detailed logic diagram of a portion of the interrupt request register (IRR) 66 shown in FIG. 2. The IRR 66 is made up of eight stages, each stage corresponding with one interrupt request input. One typical stage 212 is depicted in FIG. 7. It will be understood that the IRR 66 in its entirety includes eight stages, such as those depicted in FIG. 7. It will also be understood that a programmable interrupt controller in accordance with the spirit and scope of the invention could include any suitable number of such stages.

In accordance with the invention, FIG. 7 includes hardware designed to detect edge-triggered interrupt requests and also hardware to detect level-triggered interrupt requests. There is shown an input signal 214 called LEVEL/$\overline{\text{EDGE}}$ IRQ$_n$. This signal indicates whether an interrupt request input corresponding to the stage 212 is edge-triggered or level-triggered. The LEVEL/$\overline{\text{EDGE}}$ IRQ$_n$ signal 214 could be any of the eight output signals of the ICW5 register 108 shown in FIG. 6. Also, an input signal IRQ$_n$ 216 is shown. This is an interrupt request input and could be any one of the interrupt request inputs 68 shown in FIG. 2. Depending on the state of the LEVEL/$\overline{\text{EDGE}}$ IRQ$_n$ signal 214, an appropriate portion of the hardware depicted in FIG. 7 is used for detecting the interrupt request and latching it into the appropriate bit of the IRR 66.

In the case of level-triggered operation, the LEVEL/$\overline{\text{EDGE}}$ IRQ$_n$ signal 214 is high, thereby enabling the interrupt request IRQ$_n$ 216 through an AND gate 218 and an OR gate 220 to a metastability latch 222 at a data input 224. The metastability latch 222 is clocked by means of the system BCLK and the system CCLK as enabled by a $\overline{\text{FREEZE}}$ signal 226 through an AND gate 228. $\overline{\text{FREEZE}}$ 226 is normally high and goes low only during interrupt acknowledge cycles during which detection of a level-triggered interrupt request may be postponed.

The output of the metastability latch 222 passes through an OR gate 230 to an input of an AND gate 232. The remaining inputs of the AND gate 232 include the ICW1 signal which is high except during the programming sequence for the ICW registers 94, and SET $\overline{\text{ISR}_n}$ 234. This latter signal is a pulse which is normally high but goes low when a corresponding bit of the in service register (ISR) 88 shown in FIG. 2 is set. Accordingly, the output of the metastability latch 222 passes through the AND gate 232 to a data input of an interrupt request register (IRR) latch 236. This latch 236 stores the interrupt request so that the interrupt controller 8 can utilize it to interrupt the CPU 4 and provide suitable information for the CPU 4 to determine which interrupt service routine to execute.

As stated above, if $\overline{\text{FREEZE}}$ is low, indicating an interrupt acknowledge at the time a level-triggered interrupt request appears, the interrupt request will not be latched into the metastability latch 222 until the end of the interrupt acknowledge.

During the time interval that an interrupt is being acknowledged, there will be either two or three pulses on the $\overline{\text{INTA}}$ line 72, depending on whether the interrupt controller 8 is configured for 8080/8085 systems or 8086 systems as per the uPM bit 176 of the ICW4 register 106. During the time the interrupt is being acknowledged, the IRR latch 236 is reset and the corresponding bit of the ISR 88 is set. When the ISR bit is set, the signal SET0 $\overline{\text{ISR}_n}$ 234 pulses low. Accordingly, the output of the AND gate 232 pulses low and a low value is clocked into the IRR latch 236. This is true notwithstanding the state of the metastability latch 222. During the interrupt acknowledge and after a suitable number of $\overline{\text{INTA}}$ pulses have taken place, the IRR bit is reset and the ISR bit is set. If the automatic end of interrupt (AEOI) mode is selected by programming the AEOI bit 180 of the ICW4 register high, the ISR bit is cleared at the end of the final $\overline{\text{INTA}}$ pulse. Otherwise, the ISR bit is cleared when an appropriate EOI command is issued by the interrupt service routine. At the end of the final INTA pulse, $\overline{\text{FREEZE}}$ goes high, the CCLK is passed to the C input of the metastability latch 222. In addition, the data input to the IRR latch 236 is enabled through the OR gate 229 and AND gate 232. Thus, the output of the metastability latch 222 is latched into the IRR latch 236.

In edge-triggered operation, the hardware in the lower portion of FIG. 7, described previously, works essentially as described. However, the hardware in the upper portion of the drawing detects and latches an edge-triggered interrupt request and provides the latched interrupt request to an input of the OR gate 220. An edge-triggered interrupt request is enabled by LEVEL/$\overline{\text{EDGE}}$ IRQ$_n$ signal 214 as inverted by an inverter 238 through an AND gate 240 to an input of an edge detector 242. The output of the edge detector 242 is connected through an OR gate 244 to an input of a level converter 246.

Figure 8A:
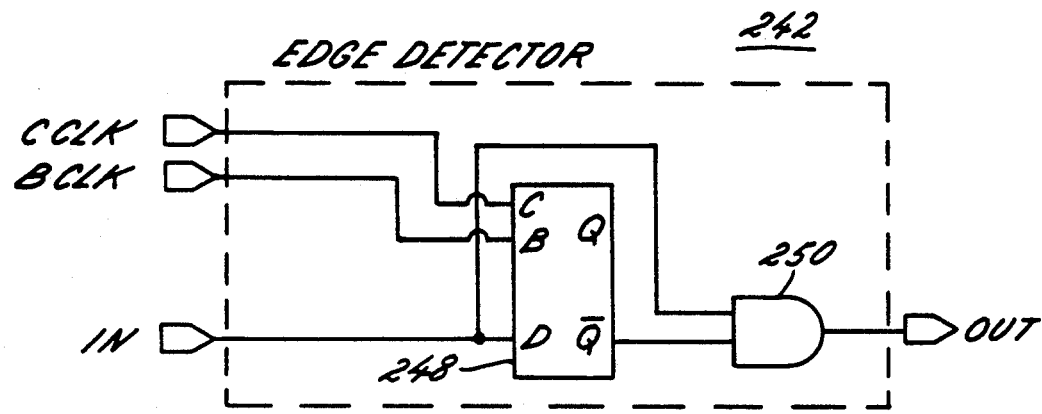
FIGS. 8A and 8B are first and second embodiments, respectively, of the edge detector shown in FIG. 7.
Figure 8B:
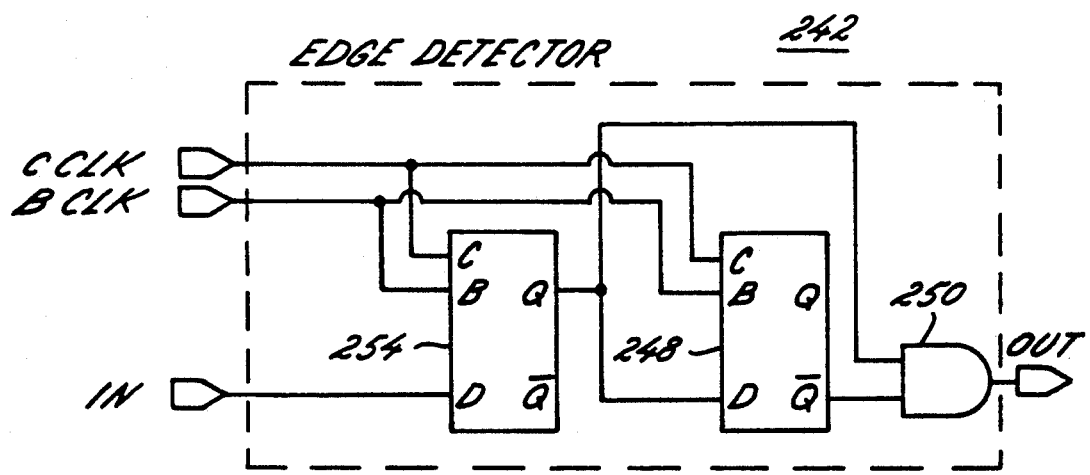

FIGS. 8A and 8B show two preferred embodiments of the edge detector 242 of FIG. 7. Referring first to FIG. 8A, there is shown a latch 248 and an AND gate 250 having inputs connected to the input and the low-true output of the latch 248. When an edge-triggered interrupt request is received, the IRQ$_n$ signal 216 makes a transition from a low state to a high state. In order for a valid edge to be detected, the transition must take place within a specified time limit, such as one clock cycle. The system CCLK and BCLK continually run, latching the input signal into the latch 248. When a transition is made, for one clock cycle the previously existing low input will have been latched into the latch 248, driving the low-true output high while the input subsequent to the transition is also high. Both inputs of the AND gate 250 are high for that time interval. An output signal from the AND gate 250 is high for one clock cycle. This high signal is latched into the level converter 246. Referring briefly back to FIG. 7, it will be seen that the high-true output of the level converter 246 is routed back to an input of an AND gate 252, the output of which is connected to an input of the OR gate 244. Thus, when the level converter 246 is latched high, it will remain high until SET $\overline{\text{ISR}_n}$ goes low or ICW1 goes low, indicating that the initialization control words are being reprogrammed. This effectively latches the edge-triggered interrupt to a high state. The output of the level converter 246 is then connected to an input of the OR gate 220. From here on, the latched edge-triggered interrupt is treated as if it were a level-triggered interrupt as described previously.

Referring to FIG. 8B, a second embodiment of the edge detector 242 is shown. This embodiment differs from that of FIG. 8A in that a synchronizing latch 254 is connected ahead of the latch 248. The IRQ$_n$ input is connected to a data input of the synchronizing latch 254, and an output of the synchronizing latch 254 is connected to an input of the edge detector latch 248 and to the AND gate 250. The latch 248 and the AND gate 250 work essentially the same way as those of the embodiment of FIG. 8A. The difference is that the synchronizing latch 254 synchronizes the edge-triggered interrupt request in terms of the systems CCLK and BCLK. This provides greater reliability of operation and permits the timing characteristics of the synchronizing latch 254 to be determined in accordance with the timing characteristics of the edge-triggered interrupt request IRQ$_n$.

FIGS. 9A-9E are tables showing typical initialization command word programming sequences for various system configurations. In addition to the ICW1, ICW4, and ICW5 registers 100, 106, 108, the ICW2 and ICW3 registers 102, 104 are shown. In each case, the salient characteristics of the configuration are written out on the right, and bits which have certain required values for implementing those system configurations are identified along with the required values. Turning to FIG. 9A, the programmable interrupt controller 8 is configured for the cascade mode. Thus, bit 1 of ICW1, SINGLE/CASCADE bit 124, is set to zero. The controller 8 is also configured for operation along with Intel 8080 or 8085 microprocessors. The uPM bit 176, bit 0 of ICW4, is zero. Also, the ICW2 register and the three most significant bits of the ICW1 register 100 are programmed with bits A15-A5 which provide the address of a page of memory having a table of interrupt service routine addresses. An address interval (ADI) bit, bit 2 of ICW1, may be is a one, indicating an interval of four bytes between interrupt service routine addresses, or a zero, indicating an interval of eight bytes between interrupt service routine addresses. In this latter case, bit 5 of the ICW1 register 100 is not used. Finally, since the interrupt controller 8 is set to the cascade mode and a master and one or more slave interrupt controllers are employed, this particular interrupt controller 8 is programmed to be the master. This is done by setting the buffered mode bit BUF, bit 3 of ICW4, to a one and setting the M/S̄ bit 178, bit 2 of ICW4, to a one.

Turning to FIG. 9B, there is shown a programming configuration identical to that of FIG. 9A except that the programmable interrupt controller 8 is configured for use with 8086 and 8088 microprocessors. The difference is that bit 0 of ICW4, the uPM bit 176, is a one. In place of the interrupt routine address bits in the ICW2 and ICW1 registers 102, 100 shown in FIG. 9A, in FIG. 11 bits 3-7 of the ICW2 register 102 contain the five most significant bits of an interrupt vector supplied to the CPU 4. The three least significant bits, which make up the remainder of the interrupt vector, are determined by which interrupt request line IRQ$_n$ 216 is active.

Turning to FIG. 9C, there is shown a programming configuration identical to that of FIG. 9A except that the interrupt controller 8 is configured to be a slave. This is done simply by setting the M/S̄ bit 178, bit 2 of ICW4, to zero.

Turning to FIG. 9D, there is shown a configuration similar that of FIG. 9A except that instead the cascade mode, the interrupt controller 8 is configured to the single mode. This is done by setting the SINGLE/CASCADE bit 124, bit 1 of ICW1, to a one. Similarly, the buffered mode bit, bit 3 of ICW4, is set to zero because the buffered mode is not applicable here. Also, the value of the M/S̄ bit 178 is irrelevant. It should be noted that the ICW3 register 104 has been omitted from the programming sequence shown in FIG. 9D. ICW3 contains information which is only pertinent when both a master and one or more slave interrupt controllers are present. In the case of a master controller, as shown in FIG. 9A, the ICW3 register 104 contains eight bits S7-S0 which are set to indicate whether each of the corresponding interrupt request inputs has a slave controller attached to it. In the case of a slave, as shown in FIG. 9C, only bits 2-0 of the ICW3 register 104 are used. These three bits provide a slave ID the value of which corresponds to the interrupt request input of the master interrupt controller to which the slave device is connected. Again, since the notion of master and slave are irrelevant if a single interrupt controller is employed, the ICW3 register 104 is omitted in the single mode.

Turning finally to FIG. 9E, there is shown a programming configuration in which the ICW4 register 106 is omitted. Whether ICW4 is programmed is determined by the IC4 bit, bit 0 of ICW1. In FIGS. 9A-9D, this bit has always been set high. In FIG. 9E, however, this bit is zero. Accordingly, the ICW4 register 106 is omitted and certain default values are established for bits appearing in the ICW4 register 106. First of all, the system is configured as though bit 0 of ICW4 were set to zero, indicating 8080/8085 microprocessor. Second, the system is configured as though the buffer bit, bit 3 of ICW4, were zero, i.e., the system is configured for a non-buffered mode. When the interrupt controller 8 is configured to non-buffered mode, the hardware signal SP/EN is treated as an input and its state determines whether the interrupt controller is configured as a master of a slave. In the case of FIG. 9E, it is assumed that the signal is high. Based on this assumption, the interrupt controller configures itself as a master.

In summary, there is provided, in accordance with the invention, a programmable interrupt controller having a plurality of interrupt request inputs capable of detecting either edge-triggered or level-triggered interrupt requests from peripheral devices. As shown in the illustrated embodiment, the ICW5 register 108 has a bit corresponding with each interrupt request input. The bits may be programmed to one of two states respectively corresponding to edge-triggering or level-triggering. The bits are programmable on a per bit basis. Accordingly, the interrupt request inputs of the interrupt controller may be programmed on a per interrupt basis for either level-sensitivity of edge-sensitivity. Because the interrupt request inputs may be programmed for edge-sensitivity or level-sensitivity in this manner, it is possible to upgrade a system employing the interrupt controller by changing the mix of edge-triggered or level-triggered interrupt request. Thus, the system remains backward compatible with older edge-triggered peripheral devices while accommodating newer level-triggered peripheral devices. Furthermore, through the use of the LEVEL/EDGE bit 120, the interrupt controller may be configured in a manner consistent with the Intel 8259A interrupt controller. Thus, the controller in accordance with the invention is backward compatible with software written for programming the 8259A.

While the foregoing is a presentation of a preferred embodiment of the invention, it will be understood that the invention is not limited to the disclosed embodiment. Rather, other types of interrupt controllers may embody the invention by providing a plurality of interrupt request inputs programmable on a per interrupt basis for either edge-sensitivity or level-sensitivity in any manner suitable to the architecture of that particular interrupt controller.

We claim:

1. An interrupt controller for use in a computer system having a central processing unit (CPU), a memory, and an interrupt controller for governing input/output operations between the CPU and a plurality of peripheral devices, said interrupt controller comprising:
   a plurality of inputs for receiving interrupt requests from the plurality of peripheral devices;
   means for assigning priorities to interrupt requests received by the plurality of inputs;
   an interrupt request line for indicating to the CPU the presence of an interrupt request;
   a plurality of stages corresponding to the plurality of inputs for sensing interrupt requests by one or more of the peripheral devices and transmitting the interrupt requests to the CPU said stages having a selectable mode of detecting an interrupt request, each of the stages comprising:
   a) an edge detector coupled to a one of the plurality of inputs for latching an edge-triggered interrupt request received by the one of the plurality of inputs;
   b) a level detector coupled to the one of the plurality of inputs for latching a level-triggered interrupt request received by the one of the plurality of inputs;
   c) a storage device coupled to the edge detector and the level detector for receiving and storing a detected interrupt signal; and
   a set of initialization control registers for programming the operation of the interrupt controller including:
   a level/edge register having a first state for causing the selectable mode of detecting an interrupt to be uniform for all the stages or a second state for enabling selective programming of certain ones of the edge detectors of the plurality of stages to be activated;
   a level/edge signal from the level/edge register; and
   a mode selection register responsive to the level/edge signal for receiving a set of signals separate and distinct from the level/edge signal, said set of signals separate and distinct from the level/edge signal selectively enabling the edge detectors at selected ones of the stages when the level/edge signal indicates that the level/edge register is in the second state.

2. The interrupt controller of claim 1 wherein the mode selection register has a plurality of bits, each bit of the plurality of bits respectively corresponding to a separate one of the plurality of stages, and wherein each one of the plurality of bits selectively enables the edge detector at a corresponding one of the plurality of stages.

3. The interrupt controller of claim 2 wherein each edge detector includes: (1) a data input coupled to a respective one of the plurality of inputs, said data input being operative when a respective bit of the mode selection register is in a first state to receive an edge-triggered interrupt request and (2) a latch for storing an interrupt request indicated by a signal level transition and forwarding the interrupt request to a level convertor latch for receiving and latching the interrupt request as a level.

4. The interrupt controller of claim 2 wherein the level detector at each of the plurality of stages includes a metastable latch having a data input coupled to a respective one of the plurality of inputs for receiving an interrupt request indicated by a signal level when the respective bit in the mode selection register is in a second state and having the data input coupled to an output of the edge detector means to receive an interrupt request held as a level by the edge detector when the respective bit is in a first state.

5. The interrupt controller of claim 2 wherein the level/edge register includes a bit, the bit is in a first state to indicate to the mode selection register that all of the edge detectors are to be enabled and a second state to indicate to the mode selection register that the edge detectors at certain ones of the stages are to be selectively enabled.

6. The interrupt controller of claim 2 wherein each edge detector includes:
   a synchronizing latch responsive to a one of the plurality of inputs for receiving a respective one of the interrupt requests when a corresponding bit of the mode selection register is set to a first state;
   a data output of the synchronizing latch connected to a data input of an edge detector latch; and
   a clock input to the synchronizing latch connected to receive a system clock for latching an interrupt request from the one of the plurality of inputs to the data output of the synchronizing latch such that an edge-triggered interrupt request signal is presented to a data input of the edge detector latch in synchronism with the system clock.

7. The interrupt controller as recited in claim 5 further comprising a data bus buffer connected to a system data bus, the system data bus being connected to the CPU, a read/write control logic module including the mode selection register and the level/edge register, and an internal data bus connected between the data bus buffer and the read/write control logic module, the read/write control logic module further including means for writing data on the system data bus into the mode selection register and the level/edge register via the data bus buffer and the internal data bus in response to commands from the CPU.

8. The interrupt controller in claim 7 wherein the read/write control logic module includes an interrupt output having first and second output states, the interrupt output entering the first state when a corresponding bit in an interrupt request register receives and holds an interrupt request, thereby interrupting the CPU to cause the CPU to service the interrupt request.

9. A computer system comprising:
   a central processing unit (CPU);
   a memory;
   a plurality of peripheral devices;
   a plurality of interfaces connecting the plurality of peripheral devices to a system data bus;
   an interrupt controller for governing input/output operations between the CPU and the plurality of peripheral devices by way of the interfaces, the interrupt controller comprising:
a plurality of inputs for receiving interrupt requests from the plurality of peripheral devices;
means for assigning priorities to interrupt requests received by the plurality of inputs;
an interrupt request line for indicating to the CPU the presence of an interrupt request;
a plurality of stages corresponding to the plurality of inputs for sensing interrupt requests by one or more of the peripheral devices and transmitting the interrupt requests to the CPU, said stages having a selectable mode of detecting an interrupt request, each of the stages comprising:
a) an edge detector coupled to a one of the plurality of inputs for latching an edge-triggered interrupt request received by the one of the plurality of inputs;
b) a level detector coupled to the one of the plurality of inputs for latching a level-triggered interrupt request received by the one of the plurality of inputs;
c) a storage device coupled to the edge detector and the level detector for receiving and storing a detected interrupt signal; and
a set of initialization control registers for programming the operation of the interrupt controller including:
a level/edge register having a first state for causing the selectable mode of detecting an interrupt to be uniform for all the stages or a second state for enabling selective programming of certain ones of the edge detectors of the plurality of stages to be activated;
a level/edge signal from the level/edge register; and
a mode selection register responsive to the level/edge signal for receiving a set of signals separate and distinct from the level/edge signal, said set of signals separate and distinct from the level/edge signal selectively enabling the edge detectors at selected ones of the stages when the level/edge signal indicates that the level/edge register is in the second state.

10. The computer system of claim 9 wherein the mode selection register has a plurality of bits, each bit of the plurality of bits respectively corresponding to a separate one of the plurality of stages, and wherein each one of the plurality of bits selectively enables the edge detector at a corresponding one of the plurality of stages.

11. The computer system of claim 10 wherein each edge detector includes: (1) a data input coupled to a respective one of the plurality of inputs, said data input being operative when a respective bit of the mode selection register is in a first state to receive an edge-triggered interrupt request and (2) a latch for storing an interrupt request indicated by a signal level transition and forwarding the interrupt request to a level convertor latch for receiving and latching the interrupt request as a level.

12. The computer system of claim 10 wherein the level detector at each of the plurality of stages includes a metastable latch having a data input coupled to a respective one of the plurality of inputs for receiving an interrupt request indicated by a signal level when the respective bit in the mode selection register is in a second state and having the data input coupled to an output of the edge detector means to receive an interrupt request held as a level by the edge detector when the respective bit is in a first state.

13. The computer system of claim 10 wherein the level/edge register includes a bit, the bit is in a first state to indicate to the mode selection register that all of the edge detectors are to be enabled and a second state to indicate to the mode selection register that the edge detectors at certain ones of the stages are to be selectively enables.

14. The computer system of claim 10 wherein each edge detector includes:
a synchronizing latch responsive to a one of the plurality of inputs for receiving a respective one of the interrupt requests when a corresponding bit of the mode selection register is set to a first state;
a data output of the synchronizing latch connected to a data input of an edge detector latch; and
a clock input to the synchronizing latch connected to receive a system clock for latching an interrupt request from the one of the plurality of inputs to the data output of the synchronizing latch such that an edge-triggered interrupt request signal is presented to a data input of the edge detector latch in synchronism with the system clock.

15. The computer system as recited in claim 12 further comprising a data bus buffer connected to a system data bus, the system data bus being connected to the CPU, a read/write control logic module including the mode selection register and the level/edge register, and an internal data bus connected between the data bus buffer and the read/write control logic module, the read/write control logic module further including means for writing data on the system data bus into the mode selection register and the level/edge register via the data bus buffer and the internal data bus in response to commands from the CPU.

16. The computer system in claim 15 wherein the read/write control logic module includes an interrupt output having first and second output states, the interrupt output entering the first state when a corresponding bit in an interrupt request register receives and holds an interrupt request, thereby interrupting the CPU to cause the CPU to service the interrupt request.

17. The interrupt controller of claim 2 wherein said ones of the plurality of bits selectively enable corresponding ones of the edge detectors at selected ones of the plurality of stages when the respective bit of the plurality of bits is in a first state and disable corresponding ones of the edge detectors at selected ones of the plurality of stages when the respective bit of the plurality of bits is in a second state.

18. The interrupt controller of claim 5 wherein the mode selection register and the level/edge register are addressed through a single address for programming the initialization control registers.

19. The interrupt controller of claim 13 wherein the mode selection register and the level/edge register are addressed through a single address for programming the initialization control registers.

20. An interrupt controller for use in a computer system having a central processing unit (CPU), a memory, and an interrupt controller for governing input/output operations between the CPU and a plurality of peripheral devices, said interrupt controller comprising:
a plurality of inputs for receiving interrupt requests from the plurality of peripheral devices;
means for assigning priorities to interrupt requests received by the plurality of inputs;

an interrupt request line for indicating to the CPU the presence of an interrupt request;

a plurality of stages corresponding to the plurality of inputs for sensing interrupt requests by one or more of the peripheral devices and transmitting the interrupt requests to the CPU, said stages having a selectable mode of detecting an interrupt request, each of the stages comprising:

a) an edge detector coupled to a one of the plurality of inputs for latching an edge-triggered interrupt request received by the one of the plurality of inputs;

b) a level detector coupled to the one of the plurality of inputs for latching a level-triggered interrupt request received by the one of the plurality of inputs;

c) a storage device coupled to the edge detector and the level detector for receiving and storing a detected interrupt signal; and a set of initialization control registers addressed through a single address for programming the operation of the interrupt controller including:

a level/edge register having a first state for causing the selectable mode of detecting an interrupt to be uniform for all the stages or a second state for enabling selective programming of certain ones of the edge detectors of the plurality of stages to be activated;

a level/edge signal from the level/edge register; and a mode selection register responsive to the level/edge signal for receiving a set of signals separate and distinct from the level/edge signal, said set of signals separate and distinct from the level/edge signal selectively enabling the edge detectors at selected ones of the stages when the level/edge signal indicates that the level/edge register is in the second state.

* * * * *